(12) United States Patent
Banerjee et al.

(10) Patent No.: US 7,912,910 B2
(45) Date of Patent: Mar. 22, 2011

(54) TRIGGERING A COMMUNICATION SYSTEM TO AUTOMATICALLY REPLY TO COMMUNICATIONS

(75) Inventors: Dwip N. Banerjee, Austin, TX (US);
Ranadip Das, West Bengal (IN);
Sandeep R. Patil, Maharashtra (IN);
Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 11/874,287

(22) Filed: Oct. 18, 2007

(65) Prior Publication Data
US 2009/0106367 A1    Apr. 23, 2009

(51) Int. Cl.
*G06F 15/16* (2006.01)
(52) U.S. Cl. .......... 709/206; 709/224; 709/204
(58) Field of Classification Search .......... 709/206, 709/224
See application file for complete search history.

(56) References Cited

U.S. PATENT DOCUMENTS

| | | | |
|---|---|---|---|
| 6,760,727 B1* | 7/2004 | Schroeder et al. | 1/1 |
| 7,139,804 B2* | 11/2006 | Bates et al. | 709/206 |
| 7,475,109 B1* | 1/2009 | Fletcher et al. | 709/204 |
| 2004/0006599 A1* | 1/2004 | Bates et al. | 709/206 |
| 2004/0156484 A1 | 8/2004 | Amin | |
| 2004/0196492 A1* | 10/2004 | Johnson et al. | 358/1.15 |
| 2005/0076090 A1* | 4/2005 | Thuerk | 709/207 |
| 2006/0031326 A1 | 2/2006 | Ovenden | |
| 2006/0083358 A1 | 4/2006 | Fong et al. | |
| 2007/0299924 A1* | 12/2007 | Tremblay | 709/206 |
| 2008/0104177 A1* | 5/2008 | Keohane et al. | 709/206 |
| 2008/0109735 A1* | 5/2008 | Vuong | 715/752 |
| 2008/0201435 A1* | 8/2008 | Dubovsky et al. | 709/206 |
| 2008/0294730 A1* | 11/2008 | Oral et al. | 709/206 |
| 2009/0030933 A1* | 1/2009 | Brezina et al. | 707/102 |
| 2009/0037541 A1* | 2/2009 | Wilson | 709/206 |
| 2009/0141934 A1* | 6/2009 | Caillon et al. | 382/102 |

FOREIGN PATENT DOCUMENTS

EP    1650942 A1    4/2006

\* cited by examiner

*Primary Examiner* — Aaron Strange
*Assistant Examiner* — Jonathan Bui
(74) *Attorney, Agent, or Firm* — David A. Mims, Jr.; Amy J. Pattillo (57) ABSTRACT

A communication system, which facilitates distribution of electronic communications for a user account, includes an emergency auto-reply agent that scans each received communication addressed to the user account for a particular communication sent from at least one emergency address specified for the user account separate from the address of the user account. Responsive to the communication system detecting the particular communication sent from one of the emergency addresses, the emergency auto-reply agent parses the content of the particular communication to detect whether the particular communication comprises a required password. Responsive to detecting the required password within the content of the particular communication, the emergency auto-reply agent directs the communication system to compose and send auto-reply communications from the user account in reply to received communications addressed to the user account.

15 Claims, 6 Drawing Sheets

TRIGGERING A COMMUNICATION SYSTEM TO AUTOMATICALLY REPLY TO COMMUNICATIONS

BACKGROUND OF THE INVENTION

1. Field of the Invention

The present invention relates generally to an improved communication system and, in particular to an improved computer implemented method, system, and computer program product for triggering a communication system to manage automatic replies to electronic communications received for a user through a communication addressed to the user received by the communication system, such that the communication system is triggered to provide automatic replies to communications addressed to a user without the user having to log in to a user account at the communication system to trigger the automatic replies.

2. Description of the Related Art

Both businesses and individuals rely on network based communications, such as electronic mail messaging, text messaging, voice messaging, and instant messaging, as the key medium for communication. Communication services continue to try to improve the efficiency and effectiveness of communications between users.

One example of a service provided to improve efficiency and effectiveness of communications is an automatic reply service. A user logged into a communication account with a communication service provider may trigger the automatic reply service to automatically generate and send a reply communication to communications received for the user. By enabling a user to trigger an automatic reply (auto-reply) service when logged into a communication account, when a user is not available to accept communications, those attempting to contact the user receive an automatic reply communication letting them know the user is not available.

While an automatic reply service is useful, a limitation of current automatic reply services provided by communication service providers, is that the user still has to access the user account with the communication service provider to trigger the automatic reply service. In many scenarios, however, a user is not able to reply to electronic communications and is also not able to access or log into the user's account with the communication service provider to trigger the automatic reply service. For example, if a user has a medical emergency, the user may be isolated from accessing the user account with the communication service provider and therefore the user cannot reply to received communications at the user account and also cannot trigger the auto-reply feature to let senders know that the user cannot reply to communications because of an emergency. Where a user does not quickly reply to a communication from an authority, a customer, or other person and the user cannot set an auto-reply feature to automatically reply to these communications and indicate an emergency, the lack of reply communication could result in loss of business or other detrimental results.

In such an emergency situation, while a user could contact someone who could log into the user's account, the user would have to provide that other person with the user's password. For many users this option of sharing a password with another person is not acceptable because the user should not provide another person with access to the user's inbox of all other emails or the user could be penalized for causing a security breach by sharing the password.

Further, in an emergency situation, a user may contact a business colleague and request that the business colleague send a communication within the company, from the colleague's account, notifying others of the user's lack of availability, but the business colleague may not have the same third party, or even company based communication addresses accessible, that the user would have through the user's communication account, thus leaving some still uninformed of the user's reasons for lack of availability.

SUMMARY OF THE INVENTION

The invention provides an auto-reply feature of a communication system which can be triggered during an emergency situation through an input other than the user logging in to the communication system through an email client and specifically triggering the auto-reply feature.

A communication system, which facilitates distribution of electronic communications for a user account, includes an emergency auto-reply agent that scans each received communication addressed to the user account for a particular communication sent from one of at least one emergency address specified for the user account separate from the address of the user account. Responsive to the communication system detecting the particular communication sent from one of the emergency addresses, the emergency auto-reply agent parses the content of the particular communication to detect whether the particular communication comprises a required password. Responsive to detecting the required password within the content of the particular communication, the emergency auto-reply agent directs the communication system to compose and send auto-reply communications from the user account in reply to received communications addressed to the user account.

The communication system receives emergency trigger communication criteria, from a communication client logged into the user account. The emergency trigger communication criteria specify the emergency addresses and the required password. The communication system stores the emergency trigger communication criteria in association with the user account. Responsive to storing the emergency trigger communication criteria for the user account, the auto-reply agent is activated and starts scanning the received communications of the received communications addressed to the user account to detect the particular communication.

The auto-reply agent parses a subject line within the content of the particular communication to identify a first string specifying a password followed by a comma and followed by a second string comprising a date. Responsive to detecting the password within the subject line matches the required password, the auto-reply agent directs the communication system to send the composed reply communication in reply to a selection of received communication received after the date from among the plurality of received communication.

The auto-reply agent parses the content of the particular communication to detect a message within the content of the particular communication. In addition, reply communication is composed with the message of the particular communication specified within the reply communication.

The auto-reply agent detects whether the particular communication is addressed to at least one carbon copy recipient address. If the particular communication is addressed to at least one carbon copy recipient address, the reply communication is composed with the carbon copy recipient address from the particular communication specified as a carbon copy recipient of the reply communication.

The communication system supports one or more types of network based communications across a network to and from one or more separate user accounts. In addition, the auto-reply agent may trigger the communication system to reply to multiple different user accounts assigned to a same user.

An email system is communicatively connected to a network for facilitating receipt of email communications addressed to multiple user accounts via the network and distribution of email communications addressed from multiple user accounts via the network. The email system includes an auto-reply controller for automatically composing and sending a reply email from a selection of the user accounts for which the auto-reply controller is activated to each of multiple received emails for the selection of user accounts. In addition, the email system includes an emergency auto-reply agent activated for a particular user account from among the multiple user accounts with specified emergency trigger email criteria. The emergency auto-reply agent scans each received email for the particular user account to detect a particular received email matching the emergency trigger email criteria, wherein the emergency trigger email criteria specifies at least one emergency sender address. The emergency auto-reply agent, responsive to detecting the sender of the particular received email matching the emergency trigger email criteria, triggers the auto-reply controller for the particular user account.

The email system includes an email client for facilitating an interface through which a user logs into the particular user account and specifies the emergency trigger email criteria for activating the emergency auto-reply agent. The emergency trigger communication the emergency trigger communication specifies a first emergency sender address assigned to a same user of the particular user account and at least one additional sender address assigned to a user separate from the user of the particular user account.

The emergency trigger email criteria also includes a password and the emergency auto-reply agent may parse a subject line of the particular received email to detect whether a string within the subject line matches the password. The emergency auto-reply agent parses a subject line of the particular received email to detect whether the subject line includes a date and trigger the auto-reply controller to send the reply email to a selection of received emails to the user account after the date. The emergency auto-reply agent parses a message of the particular received email and trigger the auto-reply controller to send the reply email message specified with the message from the particular received email. The emergency auto-reply agent detects a carbon copy recipient address of the particular received email and trigger the auto-reply controller to send the reply email with the carbon copy recipient in the reply email specified to the carbon copy recipient address.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
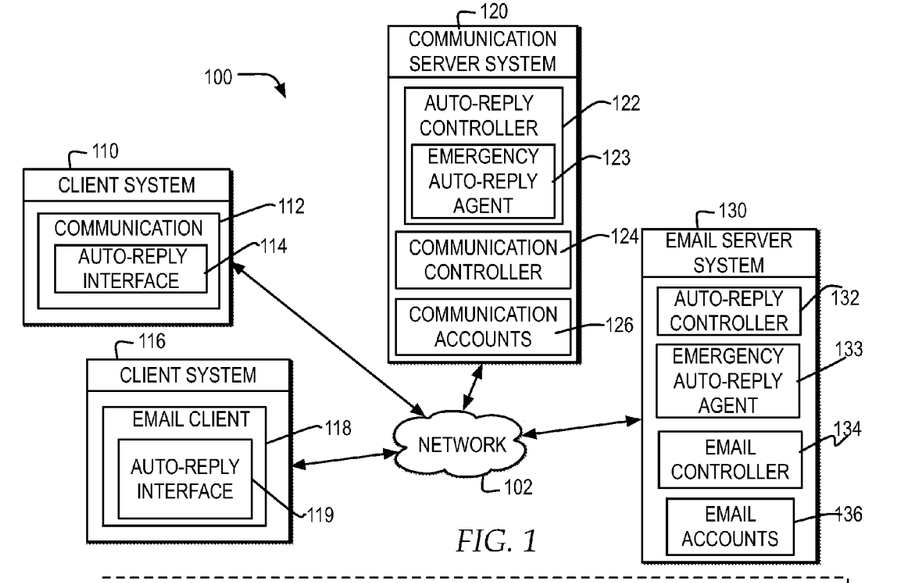
FIG. 1 is a block diagram illustrating an example of an environment in which an emergency auto-reply communication system is implemented.

With reference now to FIG. 1, a block diagram illustrates an example of an environment in which an emergency auto-reply communication system is implemented. It is important to note that network environment 100 is illustrative of one type of network environment which may support communication clients, communication servers and other components of an communication system, however, communication clients, communication servers and other components of a communication system may be implemented in other network environments. In addition, it is important to note that the distribution of systems within network environment 100 is illustrative of a distribution of systems, however, other distributions of systems within a network environment may be implemented.

As illustrated, multiple systems within network environment 100 may be communicatively connected via network 102, which is the medium used to provide communications links between various devices and computer systems communicatively connected. Network 102 may include permanent connections such as wire or fiber optics cables and temporary connections made through telephone connections and wireless transmission connections, for example. Network 102 may represent one or more of packet-switching based networks and telephony based networks, local area and wire area networks, public and private networks.

Network 102 may implement one or more layers of one or more types of network protocol stacks which may include one or more of a physical layer, a link layer, a network layer, a transport layer, a presentation layer, and an application layer. For example, network 102 may implement one or more of the Transmission Control Protocol/Internet Protocol (TCP/IP) protocol stack or an Open Systems Interconnection (OSI) protocol stack. In addition, for example, network 102 may represent the worldwide collection of networks and gateways that use the TCP/IP suite of protocols to communicate with one another.

Network environment 100 may implement multiple types of network architectures. In one example, network environment 100 may be implemented using a client/server architecture, where computing systems requesting data or processes are referred to as clients and computing systems processing data requests and processes are referred to as servers. In another example, network environment 100 may be implemented in a peer-to-peer network architecture. In yet another example, network environment 100 may be implemented in a grid architecture. It will be understood that other types of network architectures and combinations of network architectures may be implemented.

In the embodiment, as illustrated, client systems 110 and 116 are communicative connected via network 102 to one or more of communication server system 120 and email server system 130. Client systems 110 and 116 are representative of one or more client systems at which a user accesses a communication client, such as communication client 112 or email client 118. Communication client 112 may facilitate receipt or transmission of one or multiple types of communications, including but not limited to, instant messaging through an instant messaging communication channel, text messaging, email messaging, and voice messaging. Email client 118 is an example of a client specified for a particular type of communication, and in the example, that type of communication is email messaging. Communication server system 120 and email server system 130 are representatives of servers which receive and distribute communications for one or more registered communication accounts specified within communication accounts 126 or email accounts 136. Communication server system 120 may facilitate distribution of one or more of the types of communications between communication clients. Email server system 130 is an example of a server system specified for a particular type of communication, and in the example, that type of communication is email messaging.

Communication client 112 and email client 118 may each represent one or more of multiple types of applications that are enabled for accessing communication services from communication server system 120 or email server system 130 including, but not limited to, stand-alone applications and browser applications. In one example, a user logs into an email account from among email accounts 136 at email server system 130 through one of communication client 112 and email client 118. In another example, a user logs into or turns on another type of communication account from among communication accounts 126 at communication server system 120 through one of communication client 112 or email client 118.

In one example, for a user to access a communication or email account, when logging in, the user may be required to provide a user identifier and password. Communication controller 124 or email controller 134 determine whether any of the accounts in communication accounts 126 or email accounts 136, respectively, include the user identifier and whether the password matches a required password for the user identifier. A password may include, but is not limited to, text and biometric entries. In addition, in other examples, a user may log into a communication account or email account using other types of identifying information.

Communication client 112 and email client 118 each also facilitate a user interface for a user to enter a communication intended for a recipient which is then sent to communication server system 120 or email server system 130, whichever the user is logged onto, for distribution to a specified recipient. Communication controllers 124 of communication server system 130 and email controller 134 of email server system 130 receive communications with intended recipients in association with a particular account and distribute the communications to the specified recipient account within communication accounts 126, email accounts 136 or to an account at another server system which provides communication service via network 102.

In addition, communication controller 124 and email controller 134 receive communications addressed to account identifiers for communication accounts 126 and email accounts 136, respectively, and control delivery of the communications to the user at one or more of communication client 112 and email client 118, respectively, when the user logs on to access communications received for a particular account.

In distributing communications, communication controller 124 and email controller 134 translate communications from one type of communication medium into another type of communication medium. For example, communication server system 124 may translate a voice message received for a particular user into text and send the text communication to the user at communication client 112 in an email, text message, or instant message, for example.

In addition to controlling distribution of communications, the communication service provided by communication server system 120 or email server system 130 may provide an auto-reply feature for automatically generating communications in reply to received communications addressed to a particular user account and then distributing the generated auto-reply communications addressed from the user account. In the example, to provide the auto-reply feature, communication server system 120 and email server system 130 include auto-reply controllers 122 and 132, respectively, which may be triggered for generating automatic replies to incoming communications for one or more communication accounts from communication accounts 126 and email accounts 136, respectively. In generating an auto-reply communication, auto reply controllers 122 and 132 each access, for the content of the auto-reply communication, an auto-reply message specified for the auto-reply communication from communication accounts 126 or email accounts 136, respectively.

In a first example, in triggering auto-reply controller 122 or 132 and specifying the auto-reply message, a user may log in to one of communication server system 120 and email server system 130, respectively, through one of communication client 112 and email client 118 and specify, through one of auto-reply interface 114 or 119, the message for placement in an auto-reply communication. In addition, the user may specify additional preferences of an auto-reply communication, such as specifying different messages for different user identifiers, groups of users, content of the incoming email, or other rules for specifying composition of an auto-reply communication. Further, a user may specify a time period during which the auto-reply feature is to be triggered for a particular message. Moreover, the user may specify preferences for particular user identifiers, groups of users, content of the incoming email, and other rules for selecting which incoming communications not to automatically reply to with an auto-reply communication. Further, for communication server system 120, a user may specify which type of communication to use in an auto-reply communication.

Communication client 112 or email client 118 sends the automatic reply message and rules entered through auto-reply interfaces 114 and 119 to one of communication server systems 120 or email server system 130 for storage in association with the user's communication account within communication accounts 126 or email accounts 136, respectively, which also enables the communication account to trigger auto-reply controller 122 or 132, respectively. When auto-reply controller 122 or 132 is triggered for a communication account, as communication controller 124 or email controller 134 receives an incoming communication addressed to the auto-reply designated communication account, auto-reply controller 122 or 132, respectively, automatically generates a reply communication to the incoming communication based on the automatic reply message specified by the user and communication controller 124 or email controller 134 distributes the reply communication to the previous sender.

In a second example, in triggering auto reply controller 122 or 132 and specifying the auto-reply communication, a user may first activate emergency auto-reply agent 123 or 133 for a communication account, where emergency auto-reply agents 123 and 133 trigger one of auto-reply controller 122 and 132, respectively, for a particular communication account. To activate emergency auto-reply agent 123 or 133, when a user is logged into communication server system 120 or email server system 130, respectively, at one of communication client 112 or email client 118, the user may designate the emergency trigger communication criteria for identifying a trigger communication through one of auto-reply interface 114 or 119. Communication client 112 or email client 118 sends the emergency trigger communication criteria to one of communication server system 120 or email server system 130 for storage in association with the user's communication account within communication accounts 126 or email accounts 136, respectively, and sets the communication account to activate emergency auto-reply agent 123 or 133, respectively, for the particular communication account.

Once activated for a particular communication account, emergency auto-reply agents 123 and 133 scans each communication received for the communication account to detect whether the incoming communication meets the emergency trigger communication criteria. If the incoming communication meets the emergency trigger communication criteria, then emergency auto-reply agent 123 or 133 reads the contents of the trigger communication, specifies the auto-reply message from the contents of the trigger communication within the particular communication account within communication accounts 126 or email accounts 136, and triggers auto-reply controller 122 or 132, respectively, to compose auto-reply communications based on the trigger communication.

By allowing a user to enable emergency auto-reply agent 123 or 133 for a particular communication account with specifications for a trigger communication, if the user later has an emergency and is not able to log in to communication server system 120 or email server system 130, for reasons such as physical impairment or because the user is not able to access communication client 112 or email client 118, the user can log into another communication account or direct another person to log into that person's communication account, and send a communication to the user's communication account which meets the additional emergency trigger communication criteria. The trigger communication directs emergency auto-reply controller 123 or 133 to turn on auto-reply controller 122 or 132, respectively, and specifies the content to be included in an auto-reply communication.

In one example, email client 118 may only be accessible within a secured area, such as at those client systems within a company's building. If an employee is away from the building and has an emergency, which will delay the employee's return, the employee can preset the emergency trigger communication criteria for a trigger email or other communication in the employee's business email account within email accounts 136. The employee or another person, on behalf of the employee, may then log in to another email account or other type of communication account, draft an email or other communication meeting the emergency trigger communication criteria, and send the email or other type of communication to the employee's business email account, to trigger auto reply controller 132 via emergency auto-reply agent 133 for the employee's business email account. In particular, email server system 130 receives the email or other type of communication sent from another account, to the employee's business account and emergency auto-reply agent 133 detects that the email or other type of communication is a trigger communication meeting the emergency trigger communication criteria. Emergency auto-reply agent 133 then triggers auto-reply controller 132 to send an auto-reply email in response to incoming emails to the employee's business email account.

In particular, in one example a trigger communication is identified because the address of the sender in the communication matches an account address specified by the user in the emergency trigger communication criteria stored in communication account 126 or email accounts 136 in association with a communication account. In addition, the trigger communication may be required to include a password or other identifier specifying that the communication is a trigger communication and not a regular communication from the sender.

In addition, in one example, the trigger communication may specify a start date within the subject line or other portion of the communication. Emergency auto-reply agent 123 or 133 detects the start date and directs auto-reply controller 122 or 132, respectively, to send an auto-reply communication to all the incoming communications received for the communication account since the start date.

Communication server system 120 and email server system 130 may offer one or more ways to turn off auto-reply controllers 122 and 132. In one example, through auto-reply interface 114 or 119, when a user is logged on through communication client 112 or email client 118, the user may select an option to turn off auto-reply controller 122 or 132. In another example, when the user specifies the message and additional criteria for applying to auto-reply communications through auto-reply interface 114 or 119, the user may specify a stop date for auto-reply controller 122 or 132 to automatically turn off. In yet another example, after receiving a trigger communication to turn on auto-reply controller 122 or 132, emergency auto-reply agent 123 or 133 may scan communications to detect a next trigger communication, which has no content or which otherwise specifies turning off the auto-reply feature.

It is important to note that, as illustrated in the example, in one embodiment, emergency auto-reply agent 123 is a component of auto-reply controller 122 and in another embodiment, emergency auto-reply agent 133 is a separate component from auto-reply controller 132. It will be understood that auto-reply controllers and emergency auto-reply agents may be distributed in other forms throughout network environment 100.

In addition, it is important to note that for each separate communication account a separate instance of auto-reply controller 122 or 132 may be launched when triggered and a separate instance of emergency auto-reply agent 123 or 133 may be launched when triggered. Additionally, it is important to note that any of auto-reply controllers 122 and 132 and emergency auto-reply agents 123 and 133 may be distributed within additional or separate server systems and may be provided by a third-party service provider separate from the service provider providing the communication service for distributing communications.

Further, it is important to note that while the example is described with reference to a user having an option to trigger auto-reply controller 122 or 132 via auto-reply interface 114 or 119 and also to trigger emergency auto-reply agent 123 or 133 to check for a trigger email meeting emergency trigger communication criteria, in other examples, a communication or email server system may only provide the option for triggering an auto-reply controller through an emergency auto-reply agent via a trigger email.

Figure 2:
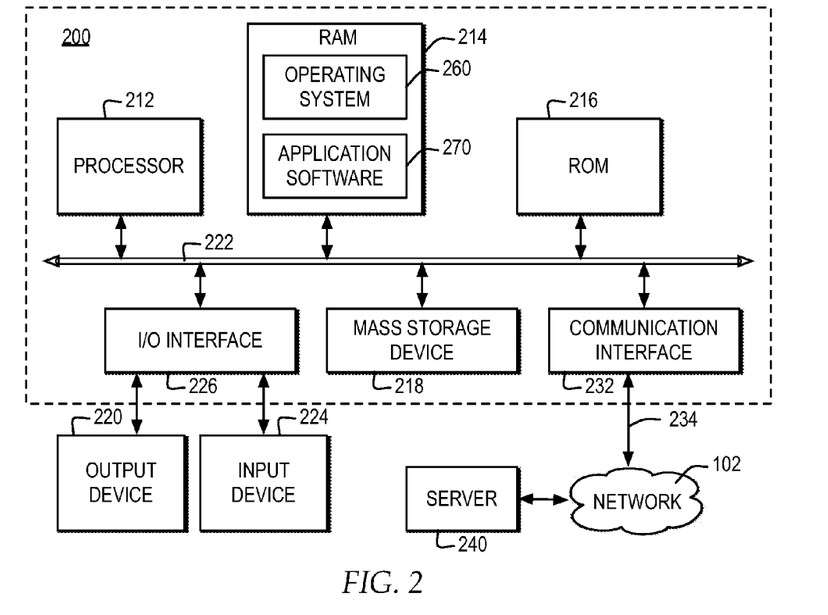
FIG. 2 is a block diagram depicting one embodiment of a computer system in which the present invention may be implemented.

Referring now to FIG. 2, a block diagram depicts one embodiment of a computer system in which the present invention may be implemented. The controllers and systems of the present invention may be executed in a variety of systems, including a variety of computing systems, such as computer system 200, communicatively connected to a network, such as network 102.

Computer system 200 includes a bus 222 or other communication device for communicating information within computer system 200, and at least one processing device such as processor 212, coupled to bus 222 for processing information. Bus 222 includes low-latency and higher latency paths that are connected by bridges and adapters and controlled within computer system 200 by multiple bus controllers. When implemented as a server, computer system 200 may include multiple processors designed to improve network servicing power. Where multiple processors share bus 222, an additional controller (not depicted) for managing bus access and locks may be implemented.

Processor 212 may be a general-purpose processor such as IBM's PowerPC™ processor that, during normal operation, processes data under the control of an operating system 260, application software 270, middleware (not depicted), and other code accessible from a dynamic storage device such as random access memory (RAM) 214, a static storage device such as Read Only Memory (ROM) 216, a data storage device, such as mass storage device 218, or other data storage medium. Application software 270 may include software for one or more of email clients 112 and 118, emergency auto-reply interface 114, auto-reply agents 122 and 132, and email controllers 124 and 134 as described in FIG. 1. In addition, application software 270 or middleware may implement one or more types of enterprise software, such as Websphere (Websphere is a registered trademark of International Business Machines Corporation) software, such as for running email server system 120 or email server system 130.

Figure 9:
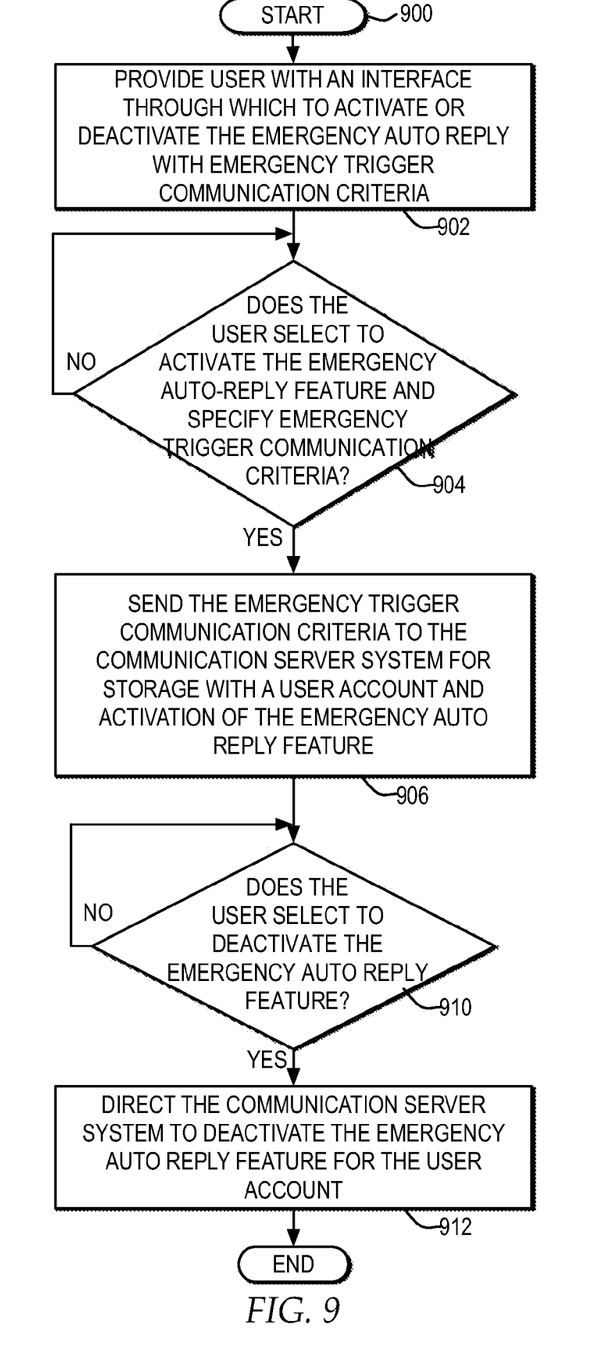
FIG. 9 is a high level logic flowchart illustrating a process and program for facilitating user specification of emergency trigger communication criteria and activating an emergency auto-reply option.
Figure 10:
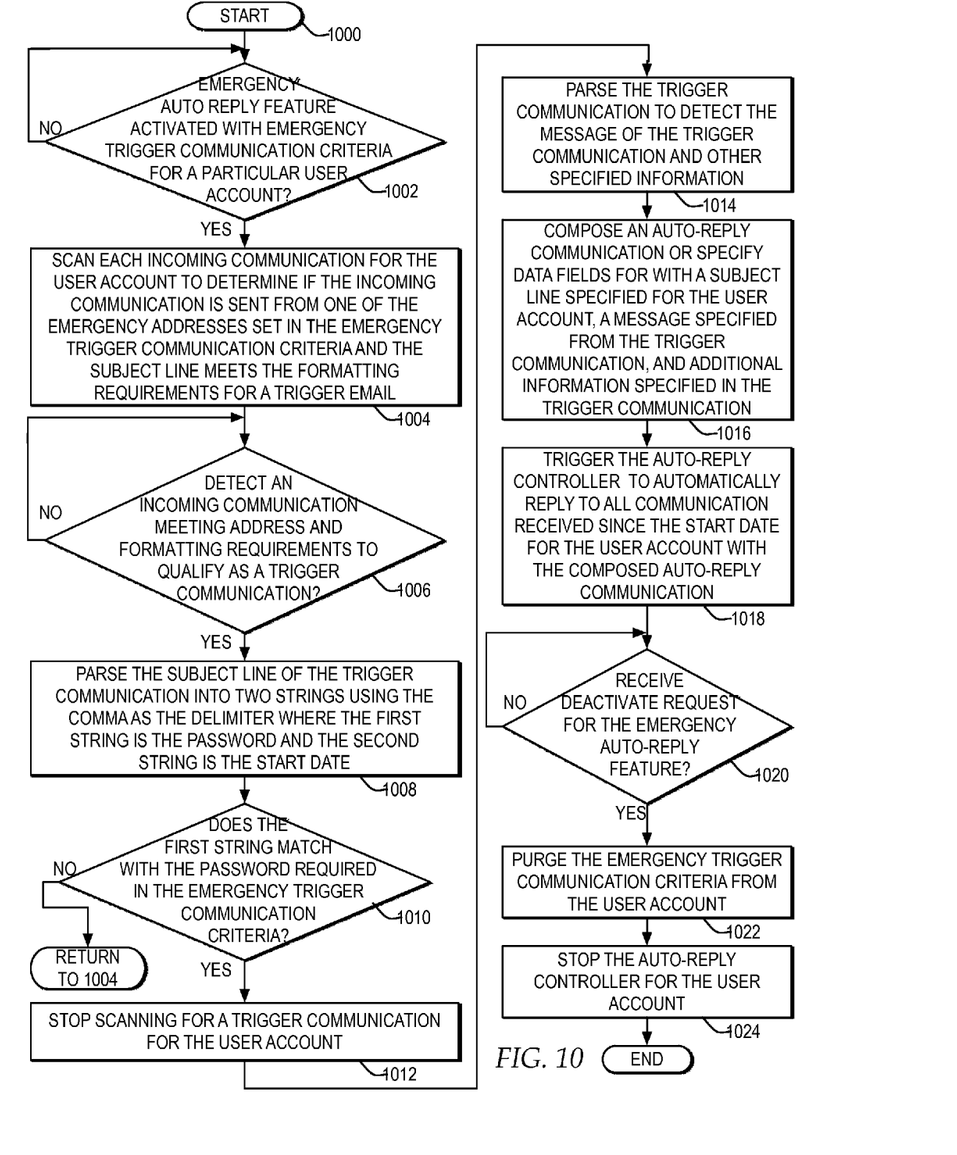
FIG. 10 is a high level logic flowchart depicting a process and program for an activated an emergency auto-reply agent for a particular user detecting a trigger communication for a particular user account, and triggering an auto-reply controller to automatically reply to communications received for the user.

In one embodiment, the operations performed by processor 212 may control enabling an auto-reply agent at an email server system for a user email account, scanning for trigger emails, and responsive to detecting a trigger email, composing a reply email and automatically replying to emails from a user account as described in the operations of the flowcharts of FIGS. 9 and 10 and other operations described herein. Operations performed by processor 212 may be requested by operating system 260, application software 270, middleware or other code or the steps of the present invention might be performed by specific hardware components that contain hardwired logic for performing the steps, or by any combination of programmed computer components and custom hardware components.

The present invention may be provided as a computer program product, included on a computer or machine-readable medium having stored thereon the executable instructions of a computer-readable program that when executed on computer system 200 cause computer system 200 to perform a process according to the present invention. The terms "computer-readable medium" or "machine-readable medium" as used herein includes any medium that participates in providing instructions to processor 212 or other components of computer system 200 for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 200 can read and which is suitable for storing instructions. In the present embodiment, an example of a non-volatile medium is mass storage device 218, which as depicted is an internal component of computer system 200, but will be understood to also be provided by an external device. Volatile media include dynamic memory such as RAM 214. Transmission media include coaxial cables, copper wire or fiber optics, including the wires that comprise bus 222. Transmission media can also take the form of acoustic or light waves, such as those generated during radio frequency or infrared data communications.

Moreover, the present invention may be downloaded or distributed as a computer program product, wherein the computer-readable program instructions may be transmitted from a remote computer such as a server 240 to requesting computer system 200 by way of data signals embodied in a carrier wave or other propagation medium via network 102 to a network link 234 (e.g. a modem or network connection) to a communications interface 232 coupled to bus 222. Communications interface 232 provides a two-way data communications coupling to network link 234 that may be connected, for example, to a local area network (LAN), wide area network (WAN), or directly to an Internet Service Provider (ISP). In particular, network link 234 may provide wired and/or wireless network communications to one or more networks, such as network 102. Further, although not depicted, communication interface 232 may include software, such as device drivers, hardware, such as adapters, and other controllers that enable communication. When implemented as a server, computer system 200 may include multiple communication interfaces accessible via multiple peripheral component interconnect (PCI) bus bridges connected to an input/output controller, for example. In this manner, computer system 200 allows connections to multiple clients via multiple separate ports and each port may also support multiple connections to multiple clients.

Network link 234 and network 102 both use electrical, electromagnetic, or optical signals that carry digital data streams. The signals through the various networks and the signals on network link 234 and through communication interface 232, which carry the digital data to and from computer system 300, may be forms of carrier waves transporting the information.

In addition, computer system 200 may include multiple peripheral components that facilitate input and output. These peripheral components are connected to multiple controllers, adapters, and expansion slots, such as input/output (I/O)

interface 226, coupled to one of the multiple levels of bus 222. For example, input device 224 may include, for example, a microphone, a video capture device, a body scanning system, a keyboard, a mouse, or other input peripheral device, communicatively enabled on bus 222 via I/O interface 226 controlling inputs. In addition, for example, an output device 220 communicatively enabled on bus 222 via I/O interface 226 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 2 may vary. Furthermore, those of ordinary skill in the art will appreciate that the depicted example is not meant to imply architectural limitations with respect to the present invention. For example, computer system 200 may also be a tablet computer, laptop computer, or telephone device.

Figure 3:
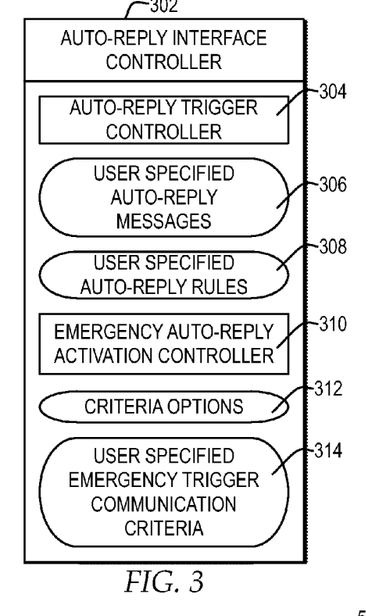
FIG. 3 is a block diagram illustrating examples of components of an auto-reply interface controller facilitated through a communication client.

With reference now to FIG. 3, a block diagram illustrates examples of components of an auto-reply interface controller facilitated through a communication client. In the example, an auto-reply interface controller 302 may be implemented by a communication client, by a communication server, or across a communication client and communication server. A user may trigger auto-reply interface controller 302 through a pull down menu or selectable option within a communication client interface. In addition, other events may trigger auto-reply interface controller 302 to facilitate user selection of auto-reply options.

In the example, auto-reply interface controller 302 includes an auto-reply trigger controller 304. Auto-reply trigger controller 304 controls interface options for a user to specify user specified auto-reply messages 306 and user specified auto-reply rules 308. In addition, auto-reply trigger controller 304 controls transmission of user specified auto-reply messages 306 and user specified auto-reply rules to a communication server for storage with a user account and controls triggering of an auto-reply controller for the user account to generate auto-reply emails with user specified auto-reply messages according to user specified auto-reply rules 308. In one example, a user may specify one or more messages within user specified auto-reply messages 306 and the user may specify one or more rules for selecting which message to send in an auto-reply email and when to start or stop an auto-reply controller. In addition, user specified auto-reply messages and user specified auto-reply rules may include messages or rules automatically filled in based on calendar events or other types of events or data selected for specifying auto-reply messages and rules.

In addition, in the example, auto-reply interface controller includes emergency auto-reply activation controller 310. Emergency auto-reply activation controller 310 controls interface options for displaying criteria options 312 and for detecting user specified emergency trigger communication criteria 314. In addition, emergency auto-reply activation controller controls transmission of user specified emergency trigger communication criteria to a communication server for storage with a user account and controls activation of an emergency auto-reply agent for the user account to search incoming communications for a trigger communication and upon detection of a trigger communication, trigger an auto-reply controller to send auto-reply emails for the user account. In one example, criteria options 312 may specify the number of and type of communication accounts the user is allowed to register, where the registered communication accounts indicate the accounts from which a trigger communication may be sent. In another example, criteria options 312 may specify the type of password required to be specified in a trigger communication. User specified emergency trigger communication criteria 314 include emergency account addresses, passwords, and other criteria specified for a user for application by an activated emergency auto-reply agent.

While auto-reply interface controller 302 is described with reference to including both auto-reply trigger controller and emergency auto-reply activation controller 310, in other embodiments, each of these controllers may be implemented by separate interface controllers.

Figure 4:
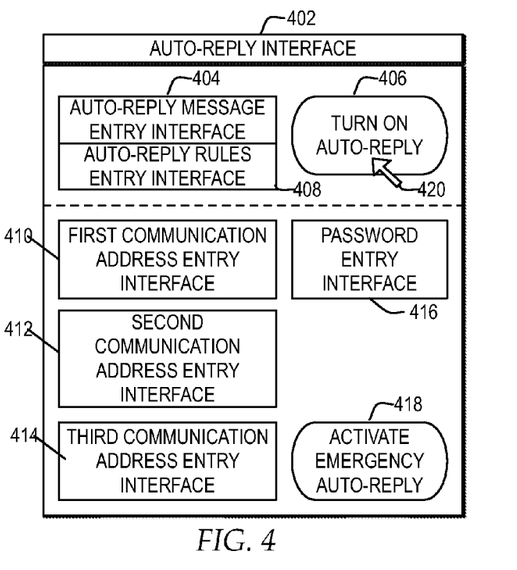
FIG. 4 is an illustrative diagram depicting an example of a displayed auto-reply interface through which a user may select to activate an emergency auto-reply feature and set the criteria required for a trigger communication.

Referring now to FIG. 4, an illustrative diagram depicts an example of a displayed auto-reply interface through which a user may select to activate an emergency auto-reply feature and set the criteria required for a trigger communication. In the example, auto-reply interface controller 302 may control display of an auto-reply interface 402. In the example, auto-reply interface 402 includes selectable option 406 to turn on the auto-reply function and selectable option 418 to activate the emergency auto-reply option. In other example, selectable options 406 and 408 and corresponding data entry interface for each of the options may be displayed in separate interfaces. In addition, an auto-reply interface may include a sequence of interfaces through which an auto-reply often is turned on or an emergency auto-reply option is activated.

In particular, with regard to selecting to turn on the auto-reply option, a user may specify, within auto-reply message entry interface 404, one or more messages for specifying the content of auto-reply emails. In addition, a user may specify, within auto-reply rules entry interface 408, additional rules for specifying auto-reply emails. Additional rules may include, but are not limited to, rules for applying messages to auto-reply emails based on the recipient or other criteria and start or stop dates for sending auto-reply emails.

In addition, in particular, with regard to selecting to activate the emergency auto-reply option, a user may specify the required password within a trigger email through password entry interface 416. In addition, a user may specify, multiple communication addresses from which trigger emails can be sent. In the example, a user may specify three different communication addresses for sending trigger emails in first communication address entry interface 410, second communication address entry interface 412, and third communication address entry interface 414. In this example, criteria options 312 allow a user to specify three communication addresses from which trigger emails may be sent. In other examples, auto-reply interface 402 may include other types of entry interfaces through which a user selects communication addresses and may specify other numbers of communication addresses. Further, criteria options 312 may specify that communication addresses must be for a particular type of communication account, such as an email account.

The user may select one of selectable options 406 and 418 using a placement of a cursor 420 with a corresponding input or through other types of inputs which enable selection of options within auto-reply interface 402. In addition, the user may select to enter data or select to open additional windows with selectable data to fill in auto-reply message entry interface 404, auto-reply rules entry interface 408, first communication address entry interface 410, second communication address entry interface 412, and third communication address entry interface 414. Further, a user may select to activate an emergency auto-reply agent that monitors multiple user accounts assigned to a same person or different people from a same communication service provider or different communication service providers.

Figure 5:
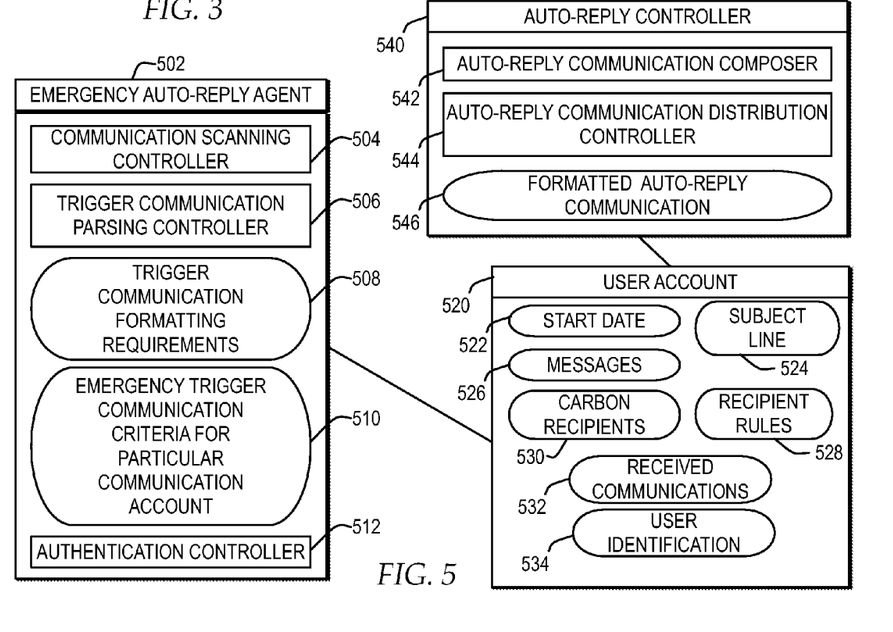
FIG. 5 is a block diagram illustrating examples of components of an emergency auto-reply agent instance for specifying the information for placement in an auto-reply email for a particular user account and for triggering an auto-reply controller to compose and send the auto-reply email.

With reference now to FIG. 5, a block diagram depicts examples of components of an emergency auto-reply agent instance for specifying the information for placement in an auto-reply email for a particular user account and for triggering an auto-reply controller to compose and send the auto-reply email. It will be understood that the components described in FIG. 5 may be physically distributed across one or more systems and that additional or alternate components may be implemented.

In the example, emergency auto-reply agent 502, such as one of or an instance of one of emergency auto-reply agents 123 and 133, includes emergency trigger communication criteria 510 specified for a particular communication account. Communication scanning controller 504 scans each communication received for the particular communication account to identify whether a communication is a trigger communication based on emergency trigger communication criteria 510. In one example, emergency trigger communication criteria 510 may specify one or more communication accounts from which a trigger communication may be sent.

If communication scanning controller 504 detects a communication sent from one of the specified communication accounts in emergency trigger communication criteria 510, then communication scanning controller determines whether the subject line of the communication meets trigger communication formatting requirements 508. In one example, trigger communication formatting requirements 508 specify that for a trigger communication which is an email, the subject line must include a first string followed by a comma and then followed by a second string which may appear as "<password string>,<date string>". In other examples, trigger communication formatting requirements 508 may require other types of characters, strings, voice streams, or graphics within the subject line for a trigger communication. Further, trigger communication formatting requirements 508 may vary based on the type of communication medium used.

If communication scanning controller 504 detects that a communication meets triggering communication formatting requirements 508, then trigger communication parsing controller 506 parses the communication to identify the content of the communication.

For example, trigger communication parsing controller 506 may parse the sender and recipients of a communication. In one example, trigger communication formatting requirements 508 may specify that if a carbon copy recipient is addressed in a trigger email, the carbon copy recipient should be included in carbon recipients 530, where carbon recipients 530 specify the additional addresses that should be carbon copied on one or more auto-reply communications. In another example, trigger communication formatting requirements 508 or emergency trigger communication criteria 510 may specify that the sender address for a trigger communication should be specified in carbon recipients 530.

In another example, trigger communication parsing controller 506 may parse the subject line to detect the strings within the subject line. In the example where the subject line includes two strings separated by a comma, trigger communication parsing controller 506 detects the first string as a password and detects the second string as a start date and stores the second string as start date 522 in user account 520.

Authentication controller 512 compares the parsed password with emergency trigger communication criteria 510. If there is not a match between the parsed password and the password requirement in emergency trigger communication criteria 510, then authentication controller 512 indicates that the communication is not a trigger communication. Otherwise, if there is a match between the parsed password and the password requirement in emergency trigger communication criteria 510, then authentication controller 512 authorizes the communication as a trigger communication to trigger communication parsing controller 506. It is important to note that in addition to searching for a password within the subject line of the trigger communication and authenticating a parsed password, authentication controller 512 may authenticate other types of password entries in other portions of the communication or from a separate communication.

Trigger communication parsing controller 506 completes parsing of the communication by detecting at least one message within the trigger communication and assigning the message to messages 526 within user account 520. In one example, within the message portion of the trigger communication, different messages may be identified matching trigger communication formatting requirements 508. For example, multiple messages may be distinguished by bracketing or other textual indicators. In addition, messages may include rules for application which meet trigger communication formatting requirements 508. For example, a message within a trigger communication may be preceded by a bracketed recipient rule that the message is to be sent in all auto-reply emails with recipients whose communication address includes a particular URL, such as a company URL. Trigger communication parsing controller 506 may parse recipient rules from a trigger communication and assign the parsed recipient rules to recipient rules 528 within user account 520.

In addition to parsing the trigger communication, trigger communication parsing controller 506 may specify the subject line for the auto-reply communication and assign the specified subject line to subject line 524 of user account 520. In one example, trigger communication parsing controller 506 detects that emergency trigger communication criteria 510 specifies the subject line, such as "John is Out of the Office due to Emergency", and assigns the specified subject line to the user account. In another example, trigger communication parsing controller 506 detects trigger communication formatting requirements 508 specify a format for generating a subject line, such as "<user name> is Out of the Office due to Emergency", personalizes the formatted subject line with the <user name>, and assigns the personalized subject line to the user account. In addition, in another example, trigger communication parsing controller 506 detects trigger communication formatting requirements 508 specify a keyword or other formatting rule where the person sending the trigger communication may specify the subject line within the subject line or message of the trigger communication, parse the communication to detect the trigger communication specified subject line, and assign the trigger communication specified subject line to the user account.

Once trigger communication parsing controller 506 completes the parsing of a trigger communication, trigger communication parsing controller 506 triggers auto-reply controller 540 to begin sending auto-reply communications to communications received as of start date 522. Auto-reply controller 540 may represent one or an instance of one of auto-reply controllers 122 and 132. In one example, emergency auto-reply agent 502 may monitor the communications for a particular user at multiple different accounts with a same communication provider or different communication providers and responsive to detecting and parsing a trigger communication from one of the accounts, automatically triggers auto-reply controllers for each of the multiple different accounts.

Auto-reply controller 540 includes an auto-reply communication composer 542 for composing formatted auto-reply communication 546 based on data accessed from user account 520. Auto-reply communication distribution controller 544 then controls distribution of specified reply emails based on formatted auto-reply communication 546, sent from the user account, in reply to one or more of received communications 532 within user account 520. In an additional or alternate example, emergency auto-reply agent 502 may implement auto-reply communication composer or may implement a separate communication composer to compose and format the auto-reply communication for distribution by auto-reply communication distribution controller 544.

In particular, in composing and distributing formatted auto-reply communication 546, auto-reply reply communication composer 542 may be required to compose and auto-reply communication distribution controller 544 may be required to distribute different formats of auto-reply communications for different recipients according to recipient rules 528. Recipient rules 528 may specify which recipients should receive which of multiple messages within messages 526, which recipients should receive which of multiple subject lines within subject line 524, which carbon copy recipients should be carbon copied on an auto-reply communication, and which recipients should receive an auto-reply communication.

It is important to note that the data accessed within user account 520 for specifying composition of and distribution of auto-reply communications may be specified by emergency auto-reply agent, by a user through an auto-reply interface, or through other users. For example, a business which provides the communication service to an employee may impose additional rules within recipient rules 528.

In one example, in composing formatted auto-reply communication 546, auto-reply communication composer 542 determines whether user account 520 includes data for subject line 524. If subject line 524 is specified, auto-reply communication composer 542 places subject line 524 in formatted auto-reply communication composition 546. If there is not a subject line specified in user account 520, auto-reply communication composer 542 may automatically generate an auto-reply subject line. In generating the auto-reply subject line, auto-reply communication composer 542 may personalize the subject line with a user name accessed from user identification 534.

In addition, in composing formatted auto-reply communication 546, auto-reply communication composer 542 determines whether user account 520 includes data for carbon recipients 530. If carbon recipients 530 are specified, auto-reply communication composer 542 specifies those addresses within carbon recipients 530 as carbon copy recipients of auto-reply communications. By including a carbon copy recipient address in an auto-reply communication, the carbon copy recipient can monitor those emails auto-replied to and determine whether any additional action should be taken.

Further, in composing formatted auto-reply communication 546, auto-reply communication composer 542 determines whether user account 520 includes data for messages 526. If messages 526 are specified, auto-reply communication composer 542 specifies the content of the auto-reply communication with one or more messages from messages 526. In one example, a trigger email may include multiple messages, each specified for distribution according to specified recipient rules. In another example, a user may specify a message within messages 526 through the auto-reply interface to automatically append to a message parsed from a trigger email. In yet another example, if no message is specified, auto-reply communication composer 542 may automatically specify a message or may not include a message.

Once auto-reply communication composer 542 composes formatted auto-reply communication 546, in one or more formats, auto-reply communication distribution controller 544 distributes formatted auto-reply communication 546 addressed from the user account. In one example, if start date 522 includes a date, auto-reply communication distribution controller 544 controls distribution of formatted auto-reply communication 546 in reply to each of the received communication within received communications 532 of a user as of the specified start date. In another example, auto-reply communication distribution controller 544 may start sending formatted auto-reply communication 546 in reply to the trigger communication and those communications received after the trigger communication. As auto-reply communication distribution controller 544 distributes formatted auto-reply communication 546, copies of the reply communications may be stored in user account 520 under sent communications, such that when a user logs back into the user's account, the user may view those received communications which were automatically replied to by auto-reply controller 540.

Figure 6:
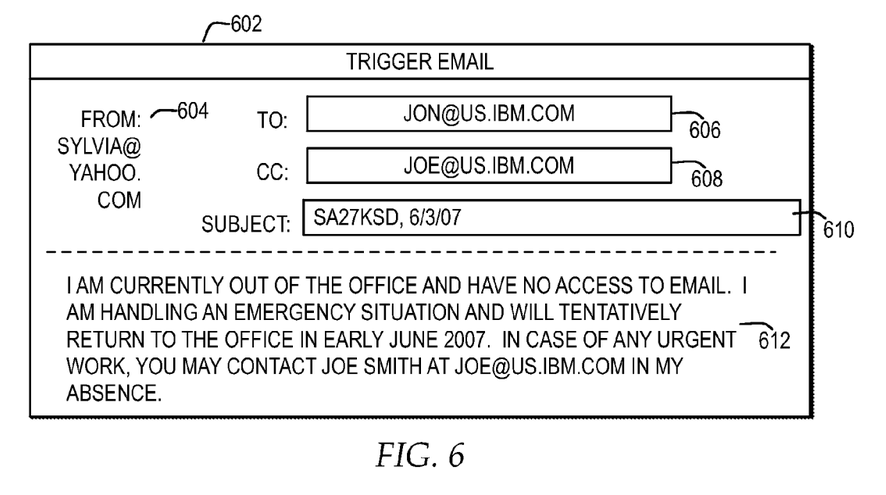
FIG. 6 is an illustrative diagram depicting an example of a displayed trigger communication for directing an activated emergency auto-reply agent to trigger an auto-reply option for a particular communication account.

Referring now to FIG. 6, an illustrative diagram depicts an example of a displayed trigger communication for directing an activated emergency auto-reply agent to trigger an auto-reply option for a particular communication account. In the example, the trigger communication is described with reference to trigger email 602. In additional or alternate embodiments, it will be understood that the trigger communication may be implemented through other types of communications.

In the example, trigger email 602 includes a recipient address 606. Recipient address 606 represents the user account for which an emergency auto-reply agent is activated and scanning emails to detect a trigger email.

In addition, in the example, trigger email 602 includes a sender address 604. Sender address 604 represents one of the trigger email addresses specified by a user in emergency trigger communication criteria as a sender address from which a trigger email may originate.

Trigger email 602 includes a carbon copy recipient address 608. Carbon copy recipient address 608 represents an address to which auto-reply emails should be carbon copied if allowed by the user in emergency trigger communication criteria. By specifying a carbon copy addressee to also be placed as a carbon copy addressee of auto-reply emails to the emails addressed to recipient address 606, carbon copy addressee 608 receives copies of those emails which are auto-replied to and the person receiving the emails sent to carbon copy addressee 608 may follow up with the limited portion of auto-replied to emails, without receiving access to the user's password or entire email log.

In addition, trigger email 602 also includes a text string representing the password, followed by a comma, followed by a text string representing the start date in subject line 610. As previously described with reference to FIG. 5, an emergency auto-reply agent may scan an email for different formatting requirements to identify the email as a trigger email. In one example, trigger communication formatting requirements may require a trigger email include a subject line with a first string, specifying the password, followed by a comma, and then followed by a second string, specifying the start date.

Trigger email 602 also includes a message 612. Message 612 represents the message to be included in auto-reply emails sent in response to emails received for the account specified by recipient address 606. As previously noted with respect to FIG. 5, a trigger email may include multiple separate addresses, distinguished by formatting elements. In addition, as previously noted with respect to FIG. 5, a trigger email may include formatting elements for setting recipient rules for specifying which recipients receive an auto-reply email, which recipients receive a message in an auto-reply email, and other rules for specifying distribution of auto-reply emails.

Figure 7:
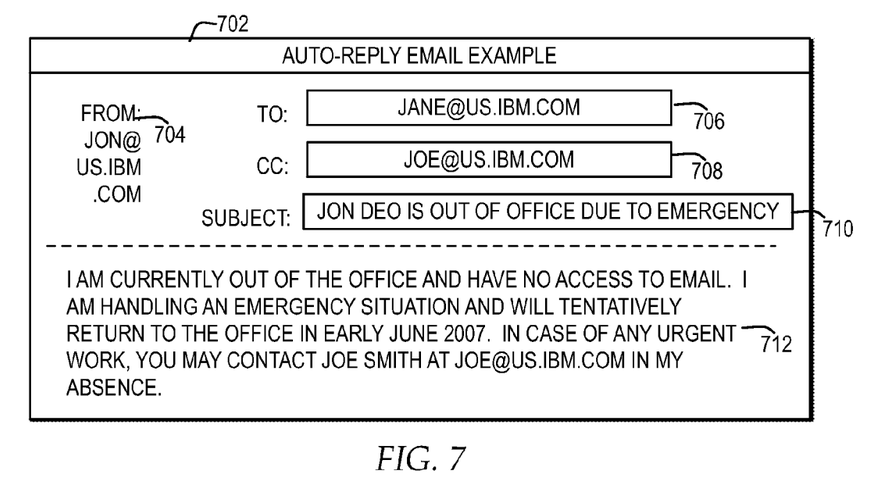
FIG. 7 is an illustrative diagram illustrating an example of a displayed auto-reply email specified by an emergency auto-reply agent.

With reference now to FIG. 7, an illustrative diagram depicts an example of a displayed auto-reply email specified by an emergency auto-reply agent. In the example, the auto-reply communication is described with reference to auto-reply email 702. In additional or alternate embodiments, it will be understood that the auto-reply communication may be implemented through other types of communications.

In the example, auto-reply email 702 includes a recipient address 706. Recipient address 706 represents one of the senders of an email to the user specified in a sender address 704, where auto-reply email 702 is sent in reply to the communication previous sent from recipient address 706. Sender address 704 is the address for the user account for which auto-reply controller composes and distributes auto-reply emails when triggered by an emergency auto reply agent.

Auto-reply email 702 includes a carbon copy recipient address 708. Carbon copy recipient address 708 represents the address to which auto-reply emails should be carbon copied. In one example, a trigger communication may specify the address to include in carbon copy recipient address 708. In another example, when a user is setting preferences for a user account, a user may specify one or more addresses to include in carbon copy recipient address 708.

In addition, auto-reply email 702 also includes subject information in subject line 710. In one example, an emergency auto-reply agent or auto-reply controller may generate personalized subject information for subject line 710. In another example, a user may specify the subject information to include in subject line 710 with a trigger email.

Auto-reply email 702 also includes a message 712. Message 712 represents the message specified in a trigger email to be included in auto-reply emails sent in response to emails received for the account specified in sender address 704.

Figure 8:
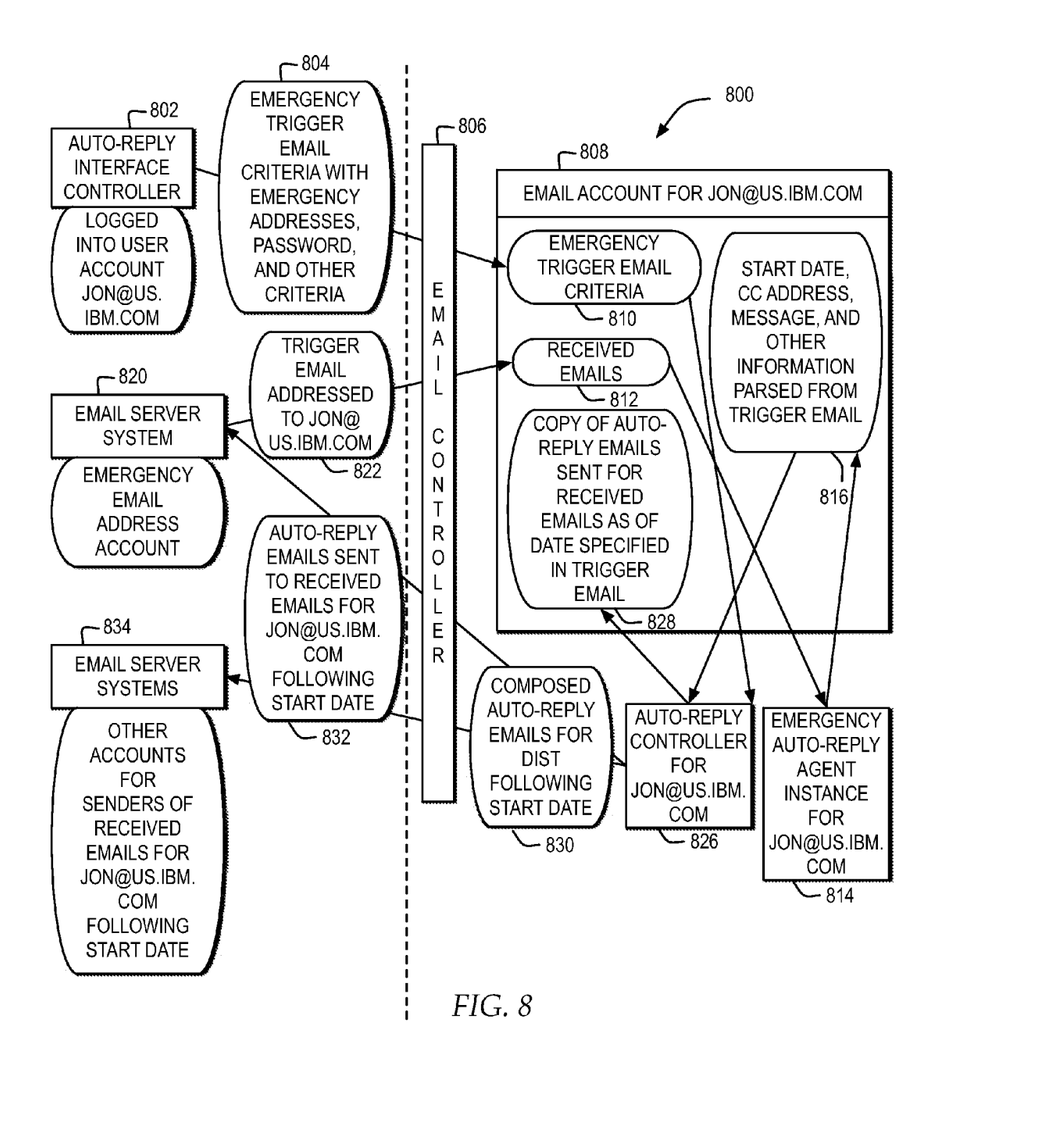
FIG. 8 is an illustrative diagram depicting an example of an email service which supports an active emergency auto-reply agent for triggering an auto-reply controller responsive to receiving a trigger email.

Referring now to FIG. 8, an illustrative diagram depicts an example of an email service which supports an active emergency auto-reply agent for triggering an auto-reply controller responsive to receiving a trigger email. It is important to note that FIG. 8 illustrates one example of distribution of data and systems for implementing an emergency auto-reply agent for trigger an auto-reply controller to send an auto-reply email.

In the example, a user logs into account "jon@us.ibm.com" provided through email service 800 through an auto-reply interface controller within an email client as illustrated at reference numeral 802 and the user selects emergency trigger email criteria with emergency email addresses, a password, and other criteria, as illustrated at reference numeral 804. As illustrated at reference numeral 806, an email controller receives the emergency trigger email criteria and stores the emergency trigger mail criteria as illustrated at reference numeral 810 within email account storage for "jon@us.ibm.com" as illustrated at reference numeral 808.

In one example, when email service 800 receives emergency trigger email criteria for a particular account, an emergency auto-reply agent instance is triggered for the account, which in the example is "jon@us.ibm.com" as illustrated at reference numeral 814. Once an emergency auto-reply agent instance is activated for a particular user account, the emergency auto-reply agent instance scans each of the received emails for the user account, as illustrated at reference numeral 812. In particular, the emergency auto-reply agent instance scans each of the received emails to determine whether the received email is a trigger email.

In the example, as illustrated at reference numeral 820, a user logs into an account with an email server system, where the account is designated within the emergency trigger email criteria for "jon@us.ibm.com" as an emergency email address account. As illustrated at reference numeral 822, from a regular email address account, which is designated by a particular user as an emergency email address account, a user sends a trigger email addressed to "jon@us.ibm.com". The trigger email is received into the email account for "jon@us.ibm.com" and the emergency auto-reply agent for "jon@us.ibm.com" detects that the email is a trigger email based on the emergency trigger email criteria for "jon@us.ibm.com."

As depicted at reference numeral 816, the emergency auto-reply agent instance for "jon@us.ibm.com" parses the trigger email for at information which may include, but is not limited to, a start date, a carbon copy (CC) address, a message, and other information parsed from the trigger email. In addition, in the example, as depicted at reference numeral 826, the emergency auto-reply agent for "jon@us.ibm.com" triggers an auto-reply controller for "jon@us.ibm.com". The auto-reply controller for "jon@us.ibm.com" formats an auto-reply email based on the information parsed from the trigger email and composes auto-reply emails for distribution in response to the selection of received emails received after the start date specified in the trigger email, as illustrated at reference numeral 830. In the example, as illustrated at reference numeral 832, auto-reply emails are sent in response to the received emails for "jon@us.ibm.com" following the start date, including an auto-reply email to the trigger email, and as illustrated at reference numeral 834, through one or more email server systems to other email accounts for senders of received emails for "jon@us.ibm.com" following the start date.

With reference now to FIG. 9, a high level logic flowchart illustrates a process and program for facilitating user specification of emergency trigger communication criteria and activating an emergency auto-reply option. In the example, the process starts at block 900 and thereafter proceeds to block 902. Block 902 illustrates providing a user with an option to activate or deactivate an emergency auto-reply option with emergency trigger communication criteria. In one example, the user is provided with the option to activate or deactivate the emergency auto-reply option through an auto-reply interface of a communication client. In addition, in one example, the user is provided with the option to activate the emergency auto-reply option for email communications through an email client. Next, block 904 depicts a determination whether the user selects to activate the emergency auto-reply feature and specify emergency trigger communication criteria. In one example, emergency trigger communication criteria include at least one emergency email account address from which a trigger email can be sent and a password. If the user selects to activate the emergency auto-reply feature, the process passes to block 906. Block 906 illustrates sending the entered emergency trigger communication criteria for storage at a user's account at a communication server system. Next, block 908 illustrates directing the communication server system to activate the emergency auto-reply feature for the user account. In an alternate example, sending the emergency trigger communication criteria to the communication server system for a user account may direct the communication server system to activate the emergency auto-reply feature for the user account. Once a user has activated the emergency auto-reply feature, as illustrated, block 910 depicts a determination whether the user selects to deactivate the emergency auto-reply feature. If the user selects to deactivate the emergency auto-reply feature, then the process passes to block 912. Block 912 depicts directing the communication server system to deactivate the emergency auto-reply feature for the user account, and the process ends.

Referring now to FIG. 10, a high level logic flowchart depicts a process and program for an activated an emergency auto-reply agent for a particular user detecting a trigger communication for a particular user account, and triggering an auto-reply controller to automatically reply to communications received for the user account. In the example, the process starts at block 1000 and thereafter proceeds to block 1002. Block 1002 illustrates a determination whether an emergency auto-reply feature is activated with emergency trigger communication criteria for a particular user account. When an emergency auto-reply feature is activated, then the process passes to block 1004. Block 1004 illustrates an emergency auto-reply agent scanning each incoming communication for the user account to determine an incoming communication is sent from one of the emergency addresses set in the emergency trigger communication criteria and the subject line meets the formatting requirements for a trigger email. Next, block 1006 depicts a determination by the emergency auto-reply agent whether an incoming communication is detected which meets the address and formatting requirements to qualify as a trigger communication. When the emergency auto-reply agent detects an incoming communication meeting the address and formatting requirements to qualify as a trigger communication is detected, then the process passes to block 1008.

Block 1008 illustrates the emergency auto-reply agent parsing the subject line or other portion of the trigger communication into two strings where the first string is the password and the second string is the start date. Next, block 1010 depicts a determination whether the first string matches the password required in the emergency trigger communication criteria for the user account. If the first string does not match the password required in the emergency trigger communication criteria for a user account, then the process returns to block 1004. Otherwise, if the first string does match the password required in the emergency trigger communication criteria for a user account, then the process passes to block 1012. Block 1012 illustrates stopping scanning for a trigger communication for the user account. Next, block 1014 depicts the emergency auto-reply agent parsing the trigger communication to detect the message of the trigger communication and other specified information. Thereafter, block 1016 depicts composing an auto-reply communication or specifying data fields for an auto-reply controller to apply in composing an auto-reply communication, with a subject line specified for the user account, a message specified from the trigger communication, and additional information, such as carbon copy recipients, specified in the trigger communication, and the process passes to block 1018.

Block 1018 illustrates triggering the auto-reply controller to automatically reply to all communications received for the user account since the start date with the specified, composed auto-reply communication. Next, block 1020 depicts a determination whether a request to deactivate the emergency auto-reply feature for a particular user account is received, such as from a communication client logged into the user account. In another example, when a user selects to turn off an auto-reply controller from a communication client, turning off the auto-reply controller may also trigger a request to deactivate the emergency auto-reply feature. If a request to deactivate the emergency auto-reply feature is detected, then the process passes to block 1022. Block 1022 illustrates purging the emergency trigger communication criteria from the user account. Next, block 1024 depicts stopping the auto-reply controller for the user account, and the process ends.

While the invention has been particularly shown and described with reference to a preferred embodiment, it will be understood by those skilled in the art that various changes in form and detail may be made therein without departing from the spirit and scope of the invention.

What is claimed is:

1. A system for triggering a communication system to automatically reply to email communications received for a user account facilitated by the email server communication system, comprising:
    an emergency auto-reply agent of the email server for scanning each received email communication of a plurality of received email communications addressed to a user account at the email server communication system for a particular email communication addressed from at least one emergency address specified in association with the user account separate from the address of the user account;
    the emergency auto-reply agent, responsive to detecting the particular email communication addressed from the at least one emergency address, for parsing the content of the particular email communication content to detect whether the particular email communication comprises a required password by parsing a subject line within the content of the email particular communication to identify a first string specifying a password followed by a comma and followed by a second string comprising a date; and
    the emergency auto-reply agent, responsive to detecting the required password within the content of the particular email communication by detecting the password within the subject line matches the required password, for automatically composing a reply email communication addressed from the user account and triggering the email server communication system to automatically send the composed reply communication in reply to a selection of received email communications received after the date from among the plurality of received email communications addressed to the user account.

2. The system according to claim 1, further comprising:
    the email server communication system for receiving, from a communication client logged into the user account at the email server communication system, emergency trigger communication criteria comprising the at least one emergency address and the required password;
    the email server communication system for storing the emergency trigger communication criteria in association with the user account at the email server communication system; and
    the email server communication system, responsive to storing the emergency trigger communication criteria for the user account, for activating the emergency auto-reply agent to scan of each received email communication of the plurality of received email communications addressed to the user account at the email server communication system.

3. The system according to claim 1, further comprising:
    the emergency auto-reply agent for parsing the content of the particular email communication to detect a message within the content of the particular email communication; and
    the emergency auto-reply agent for composing the reply email communication addressed from the user account with the message from the content of the particular email communication specified within the reply email communication.

4. The system according to claim 1, further comprising:

the emergency auto-reply agent for detecting whether the particular email communication is addressed to at least one carbon copy recipient address; and the emergency auto-reply agent, responsive to detecting the particular email communication addressed to at least one carbon copy recipient address, for composing the reply email communication addressed from the user account with the at least one carbon copy recipient address from the particular email communication specified as a carbon copy recipient of the reply email communication.

5. A method for triggering an email server to automatically reply to communications received for a user account facilitated by the email server, comprising:

enabling an email server communicatively connected to a network to facilitate receipt of email communications addressed to a plurality of user accounts via the network and to distribute the email communications addressed from a plurality of user account via the network;

controlling, within said email server, automatic composition and sending of a reply email from a selection of the plurality of user accounts for which an auto-reply controller is activated to each of a plurality of received emails for the selection of the plurality of user accounts;

activating, at the email server, an emergency auto-reply agent for a particular user account from among the plurality of user accounts with specified emergency trigger email criteria, for scanning each received email for the particular user account to detect a particular received email matching the emergency trigger email criteria, wherein the emergency trigger email criteria specifies at least one emergency sender address;

parsing by the emergency auto-reply agent, a subject line within the content of the particular received email to identify a first strong specifying a password followed by a comma and followed by a second string comprising a date;

responsive to the emergency auto-reply agent detecting the sender of the particular received email matching the emergency trigger email criteria by detecting the password within the subject line matches a required password in the emergency trigger email criteria, triggering the auto-reply controller for the particular user account to send the reply email in reply to a selection of received emails received after the date from among the plurality of email communications; and automatically composing and sending the reply email with a message matching the message specified in the particular received email matching the emergency trigger email criteria.

6. The method of claim 5, further comprising:

facilitating, at an email client system communicatively connected to the email server via the network, an interface through which a user logs into the particular user account and specifies the emergency trigger email criteria for activating the emergency auto-reply agent.

7. The method of claim 5, further comprising:

specifying, from a user entry, at the email server, a first emergency sender address assigned to a same user of the particular user account and at least one additional sender address assigned to a user separate from the user of the particular user account.

8. The method of claim 5, further comprising:

parsing by the emergency auto-reply agent, a message of the particular received email; and triggering, by the emergency auto-reply agent, the auto-reply controller to send the reply email message specified with the message from the particular received email.

9. The method of claim 5, further comprising:

parsing by the emergency auto-reply agent the particular received email to detect a carbon copy recipient address of the particular received email; and triggering, by the emergency auto-reply agent, the auto-reply controller to send the reply email with the carbon copy recipient in the reply email specified to the carbon copy recipient address.

10. The method of claim 5, further comprising:

parsing by the emergency auto-reply agent the particular received email to detect at least one rule for determining a qualified selection of recipients to receive the reply email message; and triggering, by the emergency auto-reply agent, the auto-reply controller to send the reply email to only the qualified selection of recipients addressed as senders of the plurality of received emails.

11. A program product comprising a non-transitory storage-type computer-usable medium including a computer-readable program for triggering an email server communication system to automatically reply to email communications received for a user account facilitated by the email server communication system, wherein the computer-readable program when executed on a computer causes the computer to:

scan each received email communication of a plurality of received email communications addressed to a user account at the email server communication system for a particular email communication addressed from at least one emergency address specified in association with the user account separate from the address of the user account;

responsive to detecting the particular email communication addressed from the at least one emergency address, parse the content of the particular email communication content to detect whether the particular email communication comprises a required password by parsing a subject line within the content of the particular email communication to identify a first string specifying a password followed by a comma and followed by a second string comprising a date; and responsive to detecting the required password within the content of the particular email communication by detecting the password within the subject line matches the required password, automatically compose a reply email communication addressed from the user account and triggering the email server communication system to automatically send the composed reply email communication in reply to a selection of received email communications received after the date from among the plurality of received email communications addressed to the user account.

12. The program product of claim 11, wherein said computer-readable program is transmitted over a network.

13. The program product according to claim 11, wherein the computer-readable program when executed on the computer further causes the computer to:

receive emergency trigger communication criteria comprising the at least one emergency address and the required password;

store the emergency trigger communication criteria in association with the user account at the email server communication system; and responsive to storing the emergency trigger communication criteria for the user account, activate the scanning of each received email communication of the plurality of received email communications addressed to the user account at the email server communication system.

14. The program product according to claim 11, wherein the computer-readable program when executed on the computer further causes the computer to:

parse the content of the particular email communication to detect a message within the content of the particular email communication; and compose the reply email communication addressed from the user account with the message from the content of the particular email communication specified within the reply email communication.

15. The program product according to claim 11, wherein the computer-readable program when executed on the computer further causes the computer to:

detect whether the particular email communication is addressed to at least one carbon copy recipient address; and responsive to detecting the particular email communication addressed to at least one carbon copy recipient address, compose the reply email communication addressed from the user account with the at least one carbon copy recipient address from the particular email communication specified as a carbon copy recipient of the reply email communication.

* * * * *